US009634938B2

(12) United States Patent
Agarwal et al.

(10) Patent No.: US 9,634,938 B2
(45) Date of Patent: Apr. 25, 2017

(54) ADAPTIVE SCHEDULING OF DATA FLOWS IN DATA CENTER NETWORKS FOR EFFICIENT RESOURCE UTILIZATION

(71) Applicant: International Business Machines Corporation, Armonk, NY (US)

(72) Inventors: Kanak B. Agarwal, Austin, TX (US); John B. Carter, Austin, TX (US); Colin K. Dixon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 14/072,065

(22) Filed: Nov. 5, 2013

(65) Prior Publication Data

US 2015/0124608 A1    May 7, 2015

(51) Int. Cl.
*H04L 12/803*    (2013.01)
*H04L 12/721*    (2013.01)

(52) U.S. Cl.
CPC ............ *H04L 47/122* (2013.01); *H04L 45/66* (2013.01); *H04L 45/38* (2013.01)

(58) Field of Classification Search
CPC ..... H04L 47/12; H04L 47/122; H04L 47/125; H04L 47/127; H04L 45/38; H04L 45/66; H04L 2012/568; H04L 29/08153; H04L 29/08162; H04L 29/08171; H04L 29/0818; H04L 29/08189; H04L 29/08225
See application file for complete search history.

(56) References Cited

U.S. PATENT DOCUMENTS

| | | | |
|---|---|---|---|
| 7,317,684 B2 | 1/2008 | Fodor et al. | |
| 8,098,584 B2 | 1/2012 | Zhang et al. | |
| 2008/0298274 A1* | 12/2008 | Takashige | H04L 12/4641 370/254 |
| 2012/0057466 A1 | 3/2012 | Allan et al. | |
| 2012/0182865 A1 | 7/2012 | Andersen et al. | |
| 2013/0308641 A1* | 11/2013 | Ackley | H04L 45/7457 370/392 |
| 2013/0343396 A1* | 12/2013 | Yamashita | H04L 45/124 370/401 |
| 2014/0280838 A1* | 9/2014 | Finn | H04L 49/00 709/223 |

(Continued)

OTHER PUBLICATIONS

"OpenGFlow based control for Re-routing with Differentiated flows in Data Center Networks", R. Kanagavelu et al, IEEE, 2012.*

(Continued)

*Primary Examiner* — Habte Mered
(74) *Attorney, Agent, or Firm* — VanLeeuwen & VanLeeuwen; William J. Stock

(57) ABSTRACT

An approach is provided in which a first virtual machine, executing on a host computer system, generates a data packet with a target destination at a second virtual machine over a computer network. The host computer system identifies a data flow corresponding to the data packet based the data packet's header information, and analyzes path weightings of available paths that are made available to the identified data flow. In turn, the host computer system assigns one of the available paths to the identified data flow corresponding to a pre-defined physical layer path from the first virtual machine to the second virtual machine.

20 Claims, 8 Drawing Sheets

(56) References Cited

U.S. PATENT DOCUMENTS

| | | | | |
|---|---|---|---|---|
| 2014/0341218 A1* | 11/2014 | Bays | .................. | H04L 45/74 370/392 |
| 2014/0365680 A1* | 12/2014 | van Bemmel | .......... | H04L 29/06 709/232 |
| 2015/0078152 A1* | 3/2015 | Garg | .................. | H04L 41/0668 370/219 |
| 2015/0095445 A1* | 4/2015 | Thankappan | ......... | H04L 45/125 709/214 |
| 2015/0103838 A1* | 4/2015 | Zhang | .................... | H04L 45/04 370/401 |

OTHER PUBLICATIONS

"A Loss-Free Multipath Solution for Data Center Network Using Software-Defined Networking Approach", Fang et al , IEEE, Jun. 2013.*

Al-Fares et al., "Hedera: Dynamic Flow Scheduling for Data Center Networks," Proceedings of the 7th USENIX conference on Networked systems design and implementation, Berkeley, CA, Sep. 2012, 15 pages.

Sole-Pareta et al., "Adaptive Multipath Routing of Connectionless Traffic in an ATM Network," 1995 IEEE International Conference on Communications, Seattle, CA, Jun. 1995, pp. 1626-1630.

Carle et al., "Multipath FEC Scheme for the ATM Adaptation Layer AAL5," Fourth International Conference on Broadband Communications, Stuttgart, Germany, Apr. 1998, 12 pages.

Ohta et al., "A cell loss recovery method using FEC in ATM networks," IEEE Journal on Selected Areas in Communications, vol. 9, Issue 9, Dec. 1991, 13 pages.

Agarwal et al., "Alternate Multi Path Routing Architecture for ATM Networks," International Journal of Computer Science and Communication Engineering, vol. 1, Issue 2, Dec. 2012, pp. 37-42.

* cited by examiner

| Master Weighting Table 190 | | | | |
|---|---|---|---|---|
| Source | Destination | Path Identifier | Link Identifiers | Path Weightings |
| Host A | Host B | AB1 | s12, s23, s35 | .7 |
| | | AB2 | s13, s35 | .2 |
| | | AB3 | s13, s34, s45 | .1 |
| Host C | Host B | CB1 | s32, s26 | .6 |
| | | CB2 | s34, s45, s56 | .2 |
| | | CB3 | s35, s56 | .2 |
| ... | ... | ... | ..... | ... |
| 200 | 210 | 220 | 225 | 230 |

FIG. 2A

| Host A Local Weighting Table 135 | | |
|---|---|---|
| Destination | Path Identifier | Path Weightings |
| Host B | AB1 | .7 |
| | AB2 | .2 |
| | AB3 | .1 |
| ... | ... | ... |
| 250 | 255 | 260 |

FIG. 2B

| Flow Table 130 | | | | | | |
|---|---|---|---|---|---|---|
| IP SRC | IP DST | SRC PORT | DST PORT | Protocol | .... | Action |
| IP A | IP B | PRT A | PRT B | PCL 1 | * | MAC DST: PID AB1 |
| ... | ... | ... | ... | ... | * | ... |
| 265 | 270 | 275 | 280 | 285 | | 290 |

ADAPTIVE SCHEDULING OF DATA FLOWS IN DATA CENTER NETWORKS FOR EFFICIENT RESOURCE UTILIZATION

BACKGROUND

The present disclosure relates to efficient resource utilization in a data center network through adaptive data flow scheduling. More particularly, the present disclosure relates to assigning a network path to a data packet flow based upon link utilization weightings of the data center network.

A software-defined data center (SDDC) is an architectural approach to virtualizing a data center infrastructure and delivering the infrastructure as a service. This approach is in contrast to traditional data centers where the infrastructure is typically defined by hardware and devices. A software-defined data center encompasses a variety of concepts and data center infrastructure components, and each component may be provisioned, operated, and managed through an application programming interface (API). The core architectural components of a software-defined data center include compute virtualization, storage virtualization, management and automation software, and network and security virtualization.

Compute virtualization is a software implementation of a computer. Storage virtualization (e.g., software defined storage) enables data center administrators to manage multiple storage types and brands from a single software interface. Management and automation software enables an administrator to provision, control, and manage all software-defined data center components. And, network and security virtualization is the process of merging hardware and software resources and networking functionality into a software-based virtual network.

Like traditional data centers, a software-defined data center groups data packet transmissions from a source entity to a destination entity in "flows," which are represented by a "flow identifier" included in the data packets. For example, the flow identifier may be a 5-tuple that includes a source/destination IP address, source/destination port number, and a protocol identifier.

A software-defined data center may generate dynamic variations in network traffic, which can cause high utilization at some links (e.g., connection between two switches or routers) while leaving other links in the network underutilized. As such, the network may experience network bottlenecks (congestion) even when the network capacity is sufficient to accommodate the existing flows between network entities.

BRIEF SUMMARY

According to one embodiment of the present disclosure, an approach is provided in which a first virtual machine, executing on a host computer system, generates a data packet with a target destination at a second virtual machine over a computer network. The host computer system identifies a data flow corresponding to the data packet based the data packet's header information, and analyzes path weightings of available paths that are made available to the identified data flow. In turn, the host computer system assigns one of the available paths to the identified data flow corresponding to a pre-defined physical layer path from the first virtual machine to the second virtual machine.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 2A is a diagram showing one example of a master weighting table that is managed by a centralized flow scheduler;

FIG. 2B is a diagram showing one example of a local weighting table that a host system references when selecting a path to assign to a new data flow;

FIG. 2C is a diagram showing one example of a flow table utilized by a host system to identify a data packet's assigned path;

DETAILED DESCRIPTION

Figure 1:
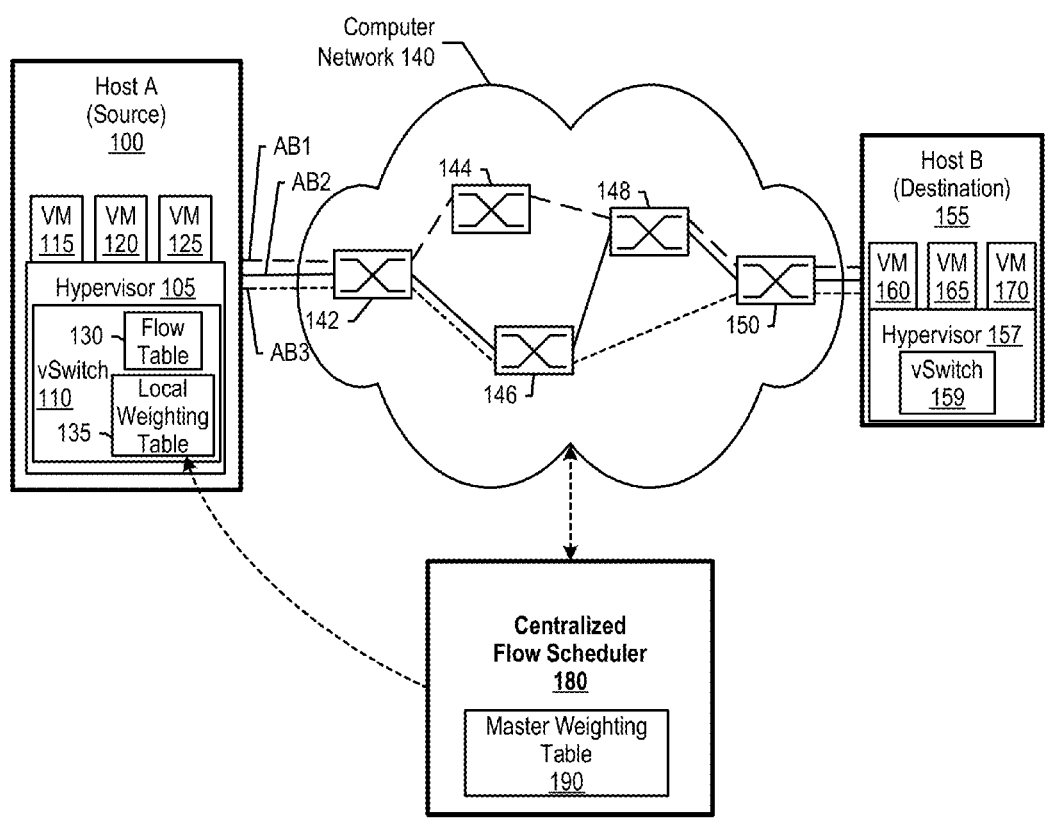
FIG. 1 is a diagram showing one example of a centralized flow scheduler managing multiple paths and path weightings between two host systems in a data center.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 is a diagram showing one example of a centralized flow scheduler managing multiple paths and path weightings between two host systems in a data center. Computer network 140 is a software defined data center network that includes multiple switches 142-150 to send data packets between host systems, such as host A 100 and host B 155. In one embodiment, centralized flow scheduler 180 configures switches 142-150 such that multiple network paths are available for host A 100 to send data to host B 155. For example, centralized flow scheduler 180 may configure forwarding tables in each of switches 142-150 such that each switch knows which port to forward a data packet based upon the data packet's path identifier (discussed below).

FIG. 1 shows that centralized flow scheduler configured three available paths for host A 100 to send data packets to host B 155, which are paths AB1, AB2, and AB3. Path AB1 (long dashed lines) sends packets through switches 142, 144, 148, 150 and to host B 155. Path AB2 (solid line) sends packets through switches 142, 146, 148, 150, and to host B 155. Path AB3 (short dashed lines) sends packets through switches 142, 146, 150 and to host B 155.

Centralized flow scheduler 180 adds a table entry in master weighting table 190 for each available path, which includes a path identifier, the path's corresponding links, and an initial random path weighting (see FIG. 2A and corresponding text for further details). In turn, centralized flow scheduler 180 sends table entries to each host that corresponds to the particular host. For example, centralized flow scheduler 180 sends table entries to host A 100 corresponding to paths AB1, AB2, and AB3, which host A 100 stores in local weighting table 135 (see FIG. 2B and corresponding text for further details).

Host A 100's hypervisor 105 processes data packets initiated by virtual machines 115, 120, and 125. When hypervisor 105 receives a data packet from one of virtual machines 115, 120, or 125 with a destination of one of host B 155's virtual machines 160, 165, or 170, hypervisor 105 sends the data packet to virtual switch (vswitch) 110. Virtual switch 110 compares the header fields from the data packet against datapath rules configured in flow table 130. For example, virtual switch 110 may identify the data flow corresponding to the received data packet by extracting 5-tuple information from the data packet's header, and comparing the flow identifier with table entries included in flow table 130 that track existing flows to assigned paths (see FIG. 2C and corresponding text for further details).

If the data packet belongs to an existing data flow, virtual switch 110 applies the actions specified in the flow table 130 to the packet. The actions may include modifying the data packet's header in a way such that the data packet, when sent on the network, uses a specific path assigned to the data flow (see FIGS. 3, 5, and corresponding text for further details) and sending the packet out on a port. In turn, the modified data packet traverses through computer network 140 over the assigned path and arrives at host B 155. Hypervisor 157 and virtual switch 150 receive the data packet and forward the data packet to the appropriate one of virtual machines 160, 165, or 170.

However, when the data packet belongs to a new data flow, no matching entry exists in flow table 130 for the data flow and the data packet is sent to the virtual switch control logic. The control logic of the virtual switch 110 checks local weighting table 135 for available paths that correspond to the data packet's source and destination and assigns a path to the data flow based upon the path weightings assigned to the available paths. Virtual switch 110 generates a new table entry in flow table 130 that includes the flow identifier (e.g. 5-tuple) and the corresponding actions required to forward the packets belonging to the data flow to the assigned path. As such, when virtual switch 110 receives a subsequent data packet belonging to the same data flow, virtual switch 110 accesses flow table 130 and applies the same actions to each subsequent data packet in the data flow, causing the subsequent data packets belonging to the same data flow to be forwarded along the same assigned path.

As data packets traverse through computer network 140, certain links become highly utilized. This may be due to a single data flow from one host system, or may be from a combination of flows from multiple host systems (see FIG. 6 and corresponding text for further details). Centralized flow scheduler 180 detects the highly utilized links and updates path weightings in master weighting table 190 corresponding to the highly utilized links (see FIG. 4 and corresponding text for further details). For example, if the link between switch 144 and 148 becomes highly utilized, centralized flow scheduler 180 identifies available paths that include the link and updates their corresponding path weightings.

As such, centralized flow scheduler 180 identifies hosts that correspond to the updated path weightings and send updated path weightings to the corresponding hosts (e.g., Host A 100). In turn, when virtual switch 110 receives a data packet from virtual machines 115, 120, or 125 that are part of a new data flow, virtual switch 110 determines which path to assign to the new data flow based upon the updated path weightings. As a result, flows are dynamically assigned across multiple paths in computer network 140, thus reducing the possibility of network congestion.

FIG. 2A is a diagram showing one example of a master weighting table that is generated and managed by a centralized flow scheduler. Centralized flow scheduler 180 uses master weighting table 190 to store table entries for various paths between a source host and a destination host. FIG. 2A shows table 190 includes source host column 200, destination host column 210, path identifier column 220, link identifiers 225, and path weighting column 230.

When centralized flow scheduler 180 configures computer network 140 for multiple path options between hosts, centralized flow scheduler 180 adds table entries to table 190. As can be seen, table 190 includes three table entries for paths between host A and host B, and three table entries for paths between host C and host B. When centralized flow scheduler 180 detects highly utilized links in computer network 140, centralized flow scheduler 180 identifies paths that use the highly utilizes links (via link identifiers in column 2205), and updates the corresponding path weightings accordingly. In turn, centralized flow scheduler 180 sends the updated path weightings to the corresponding source hosts so the source hosts can update their local weighting tables with the updated path weightings (see FIG. 4 and corresponding text for further details).

FIG. 2B is a diagram showing one example of a local weighting table that a host system references when selecting a path to assign to a new data flow. Host A 100 uses table 135 to select between three paths (AB1, AB2, or AB3) when one of source host A's virtual machines send a data packet to a virtual machine that resides on host B 145. As can be seen in FIG. 2B, table 135 includes a destination host column 250, path identifier column 255, and path weighting column 260. When virtual switch 110 receives a data packet that begins a new data flow and is intended for a virtual machine on host B 140, virtual switch 110 uses the path weightings in column 260 to select a particular path to assign to the new data flow. FIG. 2B shows that path AB1 has a highest weighting of 0.7, indicating that path AB1 is a preferred path to assign to new flows. As such, virtual switch 110 assigns path AB1 to the new data flow and modifies each data packet's header corresponding to the new data flow to traverse over path AB1 (see FIG. 5 and corresponding text for further details).

FIG. 2C is a diagram showing one example of a flow table utilized by a host system to identify a data packet's assigned path. When virtual switch 110 assigns a path to a new data flow, virtual switch 110 adds a flow table entry to table 130 that includes the flow identifier for matching packets and the actions corresponding to the path identifier. Flow table 130 shows fields 265 through 285 that correspond to a 5-tuple that, in one embodiment, is used as a flow identifier that includes a source IP address, destination IP address, source port number, destination port number, and protocol identifier. As those skilled in the art can appreciate, other fields may be used to match incoming packets with rules (matching fields) in flow table 130.

Column 290 shows actions to perform when an incoming data packet's header information matches the information in columns 265 through 285. The example shown in FIG. 2C shows an embodiment where the action is to change the destination MAC address to path identifier "AB1", which may be a virtual MAC address. In this embodiment, centralized flow scheduler 180 previously configured computer network 140's switches 142-150 such that each switch knows how to route the data packet based upon matching the destination MAC address field against the virtual MAC path identifier.

Figure 3:
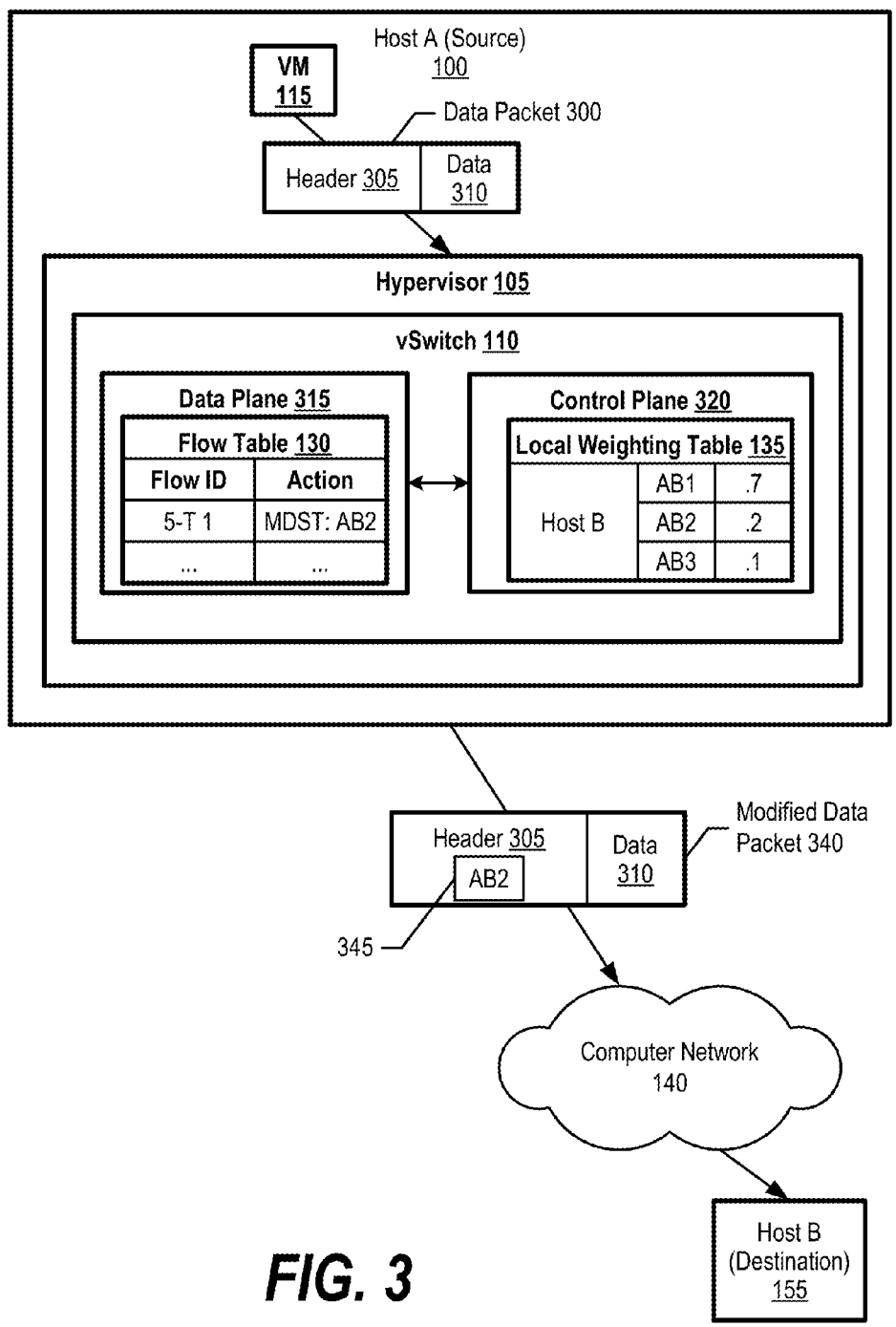
FIG. 3 is a detail diagram showing one example of a host system's virtual switch assigning a path to a data packet and modifying the data packet's header accordingly to traverse over the assigned path.

FIG. 3 is a detail diagram showing one example of a host system's virtual switch assigning a path to a data packet and modifying the data packet's header accordingly to traverse over the assigned path. Host A 100's virtual machine 115 generates data packet 300, which has a destination at a virtual machine executing on host B 155. Data packet 300 includes header 305 and data 310. Header 305 includes a flow identifier that, in one embodiment, is 5-tuple information that includes a source IP address, destination IP address, source port number, destination port number, and protocol identifier.

Hypervisor 105 receives data packet 300 and passes data packet 300 to virtual switch 110. Virtual switch 110 includes data plane 315 and control plan 320. In one embodiment, data plane 315 is responsible for modifying headers of data packets that are part of an existing data flow, and control plane 320 is responsible for assigning paths to new flows based upon current path weightings of available paths. As those skilled in the art can appreciate, data plane 315 may utilize fast kernel mode logic to perform datapath functions, whereas control plane 320 may utilize user mode logic to perform control functions.

Virtual switch 110's data plane 315 receives data packet 300 and determines whether header 305's flow identifier matches a flow identifier in flow table 130. When data plane 315 identifies a match, data plane 315 modifies header 305, in one embodiment, by replacing an existing field (destination MAC address) with a path identifier corresponding to the matching flow identifier entry (345). For example, data plane 315 may replace a MAC address corresponding to host B 155 with a virtual MAC address that computer network 140 associates to a particular path through computer network 140. In turn, data plane 315 sends modified data packet 330 to host B 155 over computer network 140.

However, when data plane 315 does not locate a matching flow identifier in flow table 130, indicating that data packet 300 is the first data packet of a new data flow, data plane 315 passes data packet 300 to control plane 320. Control plane 320 analyzes data packet 300's source and destination, and locates multiple path options that are available to data packet 300 based upon the source and destination addresses. FIG. 3 shows that local weighting table 135 includes three path options to send data packets to host B 145, which are paths AB1, AB2, and AB3.

As such, control plane 320 selects one of the available paths to assign to data packet 300's data flow based upon the path weightings, and informs data plane 315 of the assigned path. In turn, data plane 315 adds a table entry to flow table 130 that includes data packet 300's flow identifier (e.g. 5-tuple) and the actions corresponding to the assigned path identifier. Data plane 315 modifies header 305 as discussed above with the new path identifier and sends modified data packet 330 to host B 155 over computer network 140. Since data plane 315 added a new entry to flow table 130 to correspond with the new data flow, when subsequent data packets belonging to the data flow are received, data plane 315 finds a match in the flow table 130 and performs action that allows it to retrieve the previously assigned path identifier and modify the subsequent data packets' header information accordingly without passing the subsequent data packets to control plane 320 for analysis and path assignment.

Figure 4:
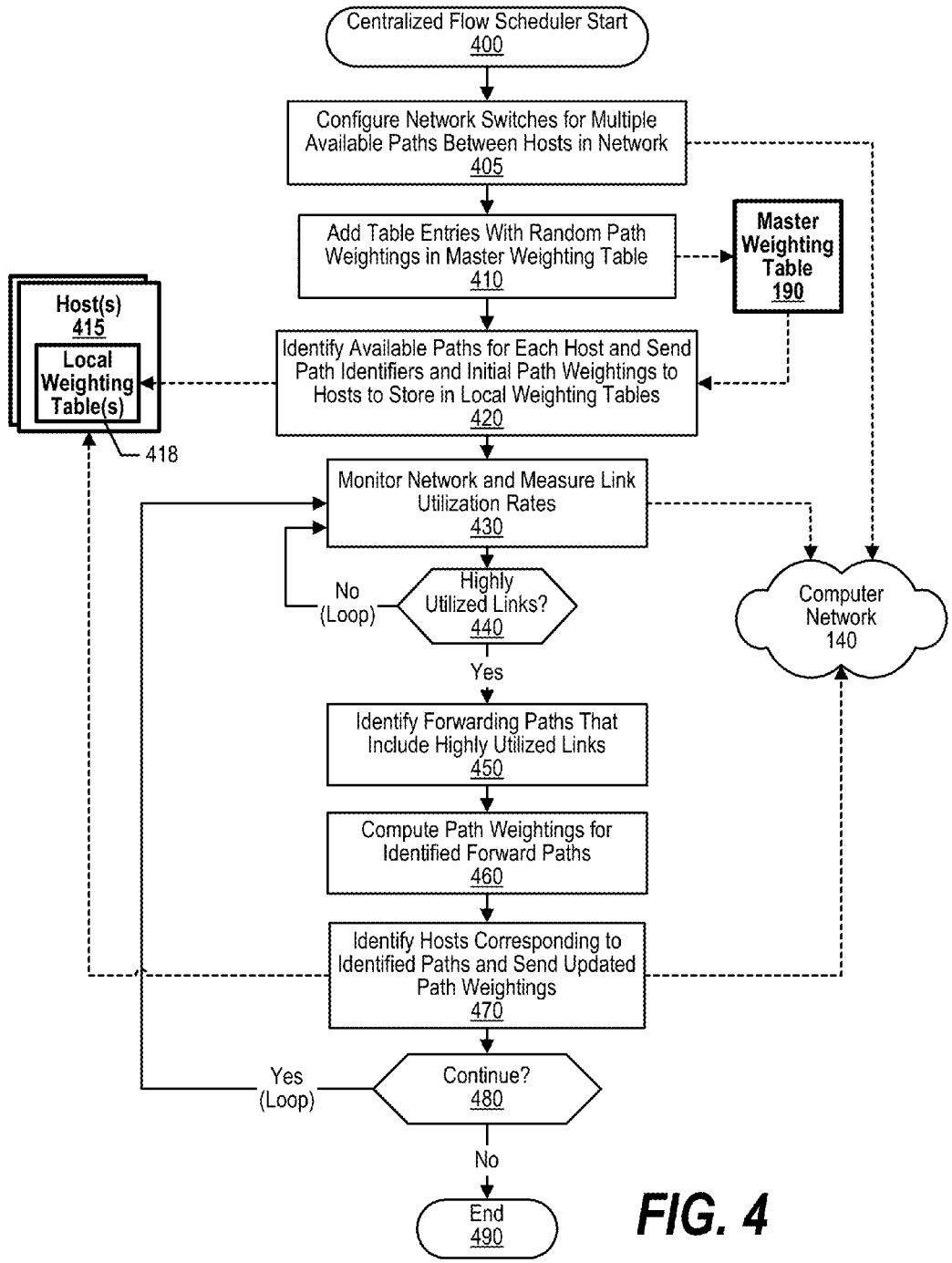
FIG. 4 is a flowchart showing one example of steps taken by a centralized flow scheduler to configure a computer network and dynamically adjust path weightings based upon link utilization rates.

FIG. 4 is a flowchart showing one example of steps taken by a centralized flow scheduler to configure a computer network and dynamically adjust path weightings based upon link utilization rates. Centralized flow scheduling commences at 400, whereupon the centralized flow scheduler configures multiple network paths that are available between hosts in computer network 140 at 405. During the configuration process, the centralized flow scheduler configures switches in computer network 140 with forwarding information corresponding to the multiple available paths. In one embodiment, each network path (available path) is a pre-defined physical layer (Layer 2) path between host computer systems (e.g., virtual machines executing on the host computer systems).

At 410, the centralized flow scheduler loads master weighting table 190 with source host information, destination host information, available path information that includes the links comprising the paths, and an initial random path weighting (see FIG. 2A and corresponding text for further details).

At 420, the centralized flow scheduler identifies available paths corresponding to each of hosts 415 and sends the corresponding path information (including the initial path weightings) to each of hosts 415. In turn, each of hosts 415's virtual switch (e.g., virtual switch 110) loads the path information in their corresponding local weighting tables 418 (e.g., local weighting table 135).

The centralized flow scheduler monitors network traffic through computer network 140 and measures link utilization rates. The centralized flow scheduler, determines whether computer network 140 includes any highly utilized links, such as by comparing the link utilization rates with a pre-determined threshold (decision 440). If no highly utilized links are detected, decision 440 branches to the "No" branch, which branches back to continue to monitor computer network 140.

On the other hand, if the centralized flow scheduler detects a highly utilized link, decision 440 branches to the "Yes" branch, whereupon the centralized flow scheduler identifies forwarding paths that include the highly utilized link (450). For example and referring to FIG. 2A, the centralized flow scheduler may determine that link "s35" is a highly utilized link and identifies paths AB1, AB2, and CB3 as using link s35.

At 460, the centralized flow scheduler computes path weightings for the identified forward paths. For each identified forward path, in one embodiment, the centralized flow scheduler uses the following formula to compute the path weightings:

$$\text{cost } [p] = w_{links} * (\text{\#links in } p) + w_{cong} * (\text{\#congested links in } p);$$

$$\text{path weight } [p] = 1/\text{cost}[p]$$

where $w_{links}$ and $w_{cong}$ are pre-defined weightings based upon how aggressively to avoid congestion versus the minimum number of links. In one embodiment, when $w_{cong}$ is chosen to be higher than $w_{links}$, then the congestion avoidance is preferred over reducing path length. In this embodiment, a longer path may be assigned lower cost than the smaller paths with more congested links. Conversely, if $w_{links}$ is set to be higher than $w_{cong}$, then path length minimization is weighted more heavily than congested link avoidance. In practice, $w_{links}$ and $w_{cong}$ weightings are configured by the network administrator based on the desired balance between reducing number of links (hops) and avoiding congested links.

In one embodiment, the centralized flow scheduler normalizes the calculated path weightings for the non-highly utilized paths and normalizes the weightings for a particular source host/destination host combination. Referring to FIG. 2A, the path weightings for host A to host B are AB1=0.7, AB2=0.2, and AB3=0.1, which sum to 1. When the centralized flow scheduler updates a path weighting for one of the paths (e.g., AB2), the centralized flow scheduler may adjust the path weightings for the other two paths so the sum of the three path weightings still result in 1.

At 470, the centralized flow scheduler identifies the hosts corresponding to the updated path weightings and sends the updated path weightings to identified hosts. In turn, the hosts update their local weighting tables with the updated path weightings. As such, when the hosts receive data packets for a new data flow, the hosts use the updated path weightings to determine which path to assign to the new data flow (see FIG. 6 and corresponding text for further details).

The centralized flow scheduler determines whether to continue monitoring computer network 140's link utilizations (decision 480). If centralized flow scheduler should continue to monitor computer network 140's link utilizations, decision 480 branches to the "Yes" branch, which loops back to monitor link utilizations and update path weightings accordingly. On the other hand, of the centralized flow scheduler should terminate computer network monitoring, decision 480 branches to the "No" branch, whereupon processing ends at 490.

Figure 5:
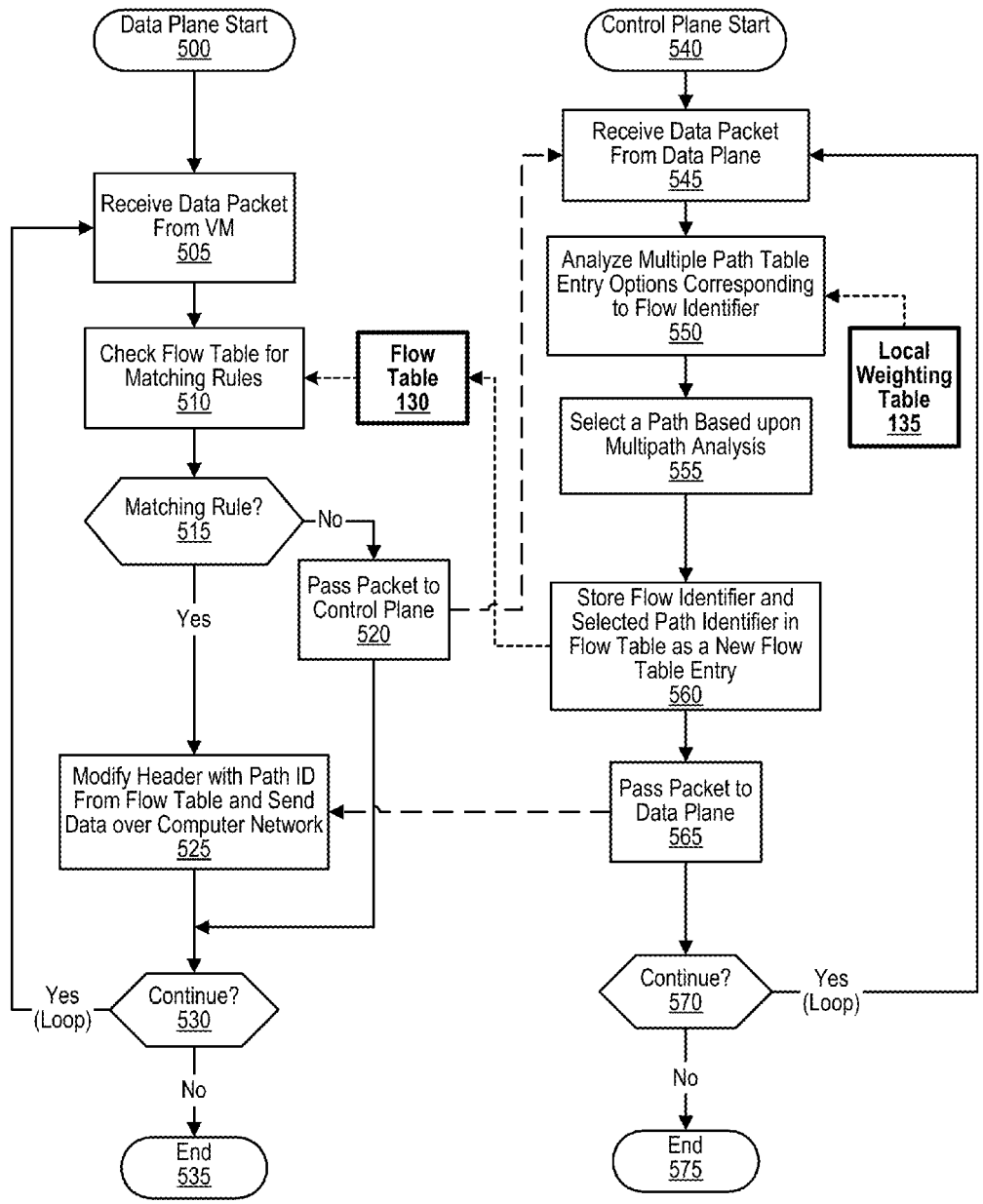
FIG. 5 is a flowchart showing one example of steps taken by a virtual switch to identify a data packet's path and modify the data packet's header for the data packet to traverse over a software defined data center network.

FIG. 5 is a flowchart showing one example of steps taken by a virtual switch to identify a data packet's path and modify the data packet's header for the data packet to traverse over a software defined data center network. Data plane 315 processing commences at 500, whereupon the data plane receives a data packet originating from a virtual machine at 505, such as a 5-tuple that identifies the source IP address, the source port number, the destination IP address, and destination port number, and the protocol identifier.

At 510, the data plane checks flow table 130 for a rule that matches the received data packet. For example, the data plane may match the data packet's 5-tuple with a flow table entry specifying the same 5-tuple information. A determination is made as to whether a matching rule was identified in flow table 130 (decision 515). If flow table 130 includes a flow table entry with a matching rule, decision 515 branches to the "Yes" branch, whereupon the data plane performs an action included in the matching flow table entry, such as modifying the data packet's destination MAC address with a specific virtual MAC address.

On the other hand, if flow table 130 does not include an entry that includes a matching rule, decision 515 branches to the "No" branch, whereupon the data plane passes the data packet to control plane 320 at 520. Control plane processing commences at 540, whereupon the control plane receives the data packet from the data plane at 545. At 550, the control plane analyzes multiple path options and their path weightings in local weighting table 135 that correspond to the data packet's data flow, and selects a path for the data flow based upon the analysis (555).

At 560, the control plane stores a flow table entry in flow table 130, which includes a rule (flow identifier information) and an action to perform (re-write destination MAC address based upon a path identifier of the selected path). At 565, the control plane passes the data packet back to the data plane, and a determination is made as to whether to continue processing (decision 570). If control plane processing should continue, decision 570 branches to the "Yes" branch, which loops back to wait for more data packets from the data plane. This looping continues until the control plane should terminate, at which point decision 570 branches to the "No" branch, whereupon control plane processing ends at 575.

Referring back to the data plane, the data plane receives the data packet from the control plane at 525, and modifies the data packet's header as discussed above by updating the path identifier in the header. A determination is made as to whether the data plane should continue (decision 530). If data plane processing should continue, decision 530 branches to the "Yes" branch, which loops back to receive data packets from virtual machines. This looping continues until the data plane terminates, at which point decision 530 branches to the "No" branch and ends at 535.

Figure 6:
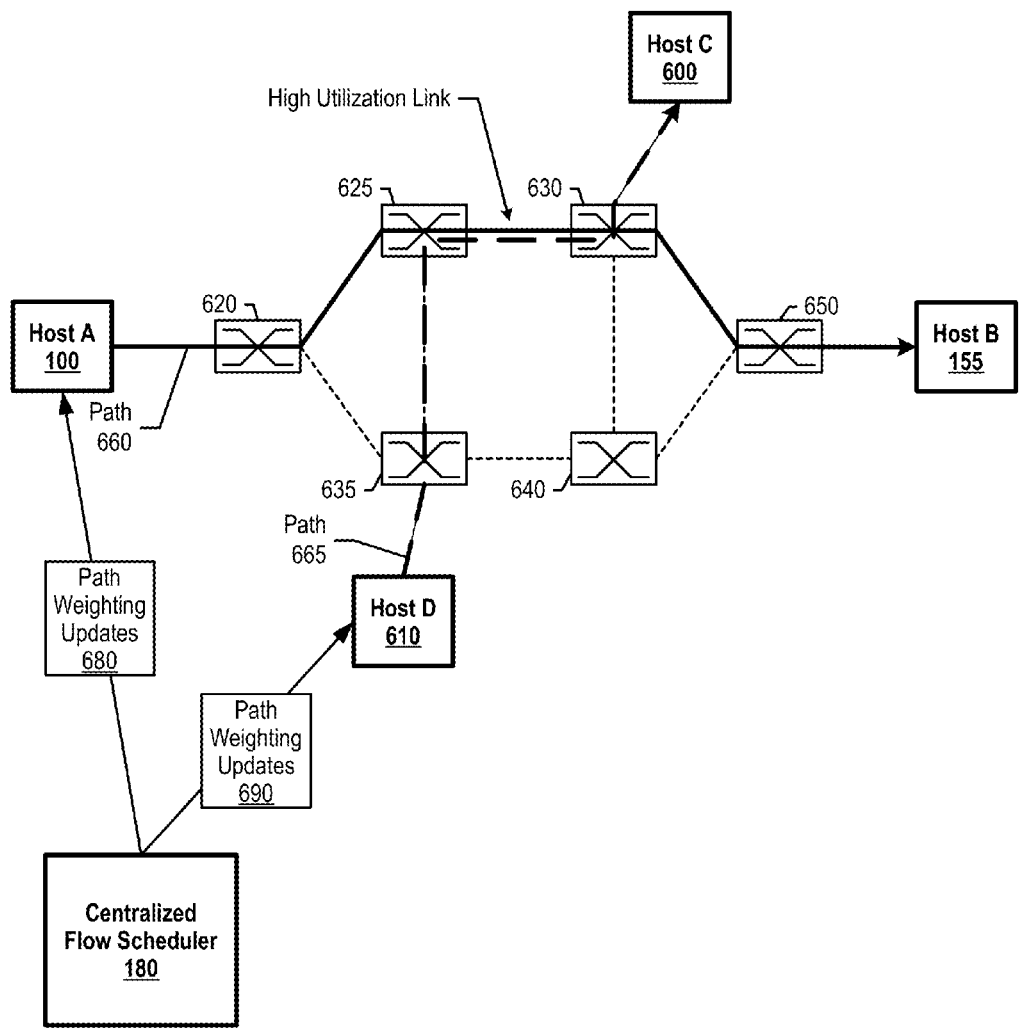
FIG. 6 is a diagram showing one example of a centralized flow scheduler sending updated path weightings to two host systems that utilize a common, highly utilized network link.

FIG. 6 is a diagram showing one example of a centralized flow scheduler sending updated path weightings to two host systems that utilize a common, highly utilized network link. Centralized flow scheduler 180 manages a software defined computer network that includes switches 620, 625, 630, 635, 640, and 650. Several hosts utilized the software defined computer network, such as host A 100, host B 155, host C 600, and host D 610 shown in FIG. 6. Host A 100 uses assigned path 660 to send packets to host B 155 that belong to a particular data flow. Path 660 (solid bold line) traverses through switches 620, 625, 630, 650, and to host B 155. Host D 610 uses assigned path 665 to send packets to host C 600 that belong to a particular data flow. Path 665 (dashed bold line) traverses through switches 635, 625, 630, and to host C 600.

Centralized flow scheduler 180 monitors link utilization rates of the software defined computer network and determines the link between switch 625 and 630 is a high utilization link. As such, centralized flow scheduler 180 identifies paths using the high utilization link (e.g., paths 660 and 665), and updates path weightings accordingly. In turn, centralized flow scheduler 180 sends path weighting updates 680 and 690 to host A 100 and host D 610, respectively. As a result, host A 100 and host D 610 may select a different path for new flows that don't utilize the high utilization link between switches 625 and 630.

Figure 7:
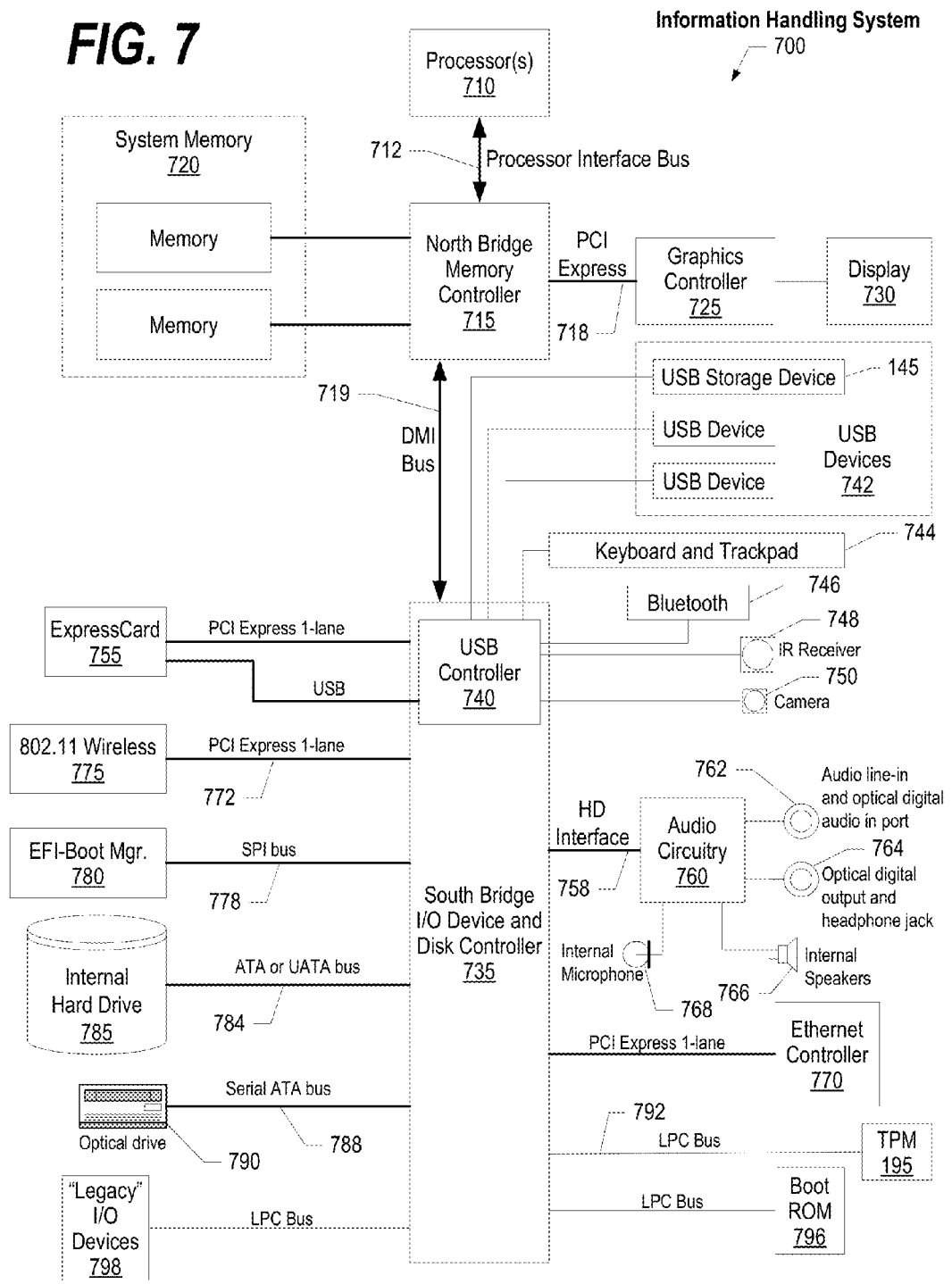
FIG. 7 is a block diagram of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard 755 is a slot that connects hot-pluggable devices to the information handling system. ExpressCard 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 795) shown in FIG. 7 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 8.

Figure 8:
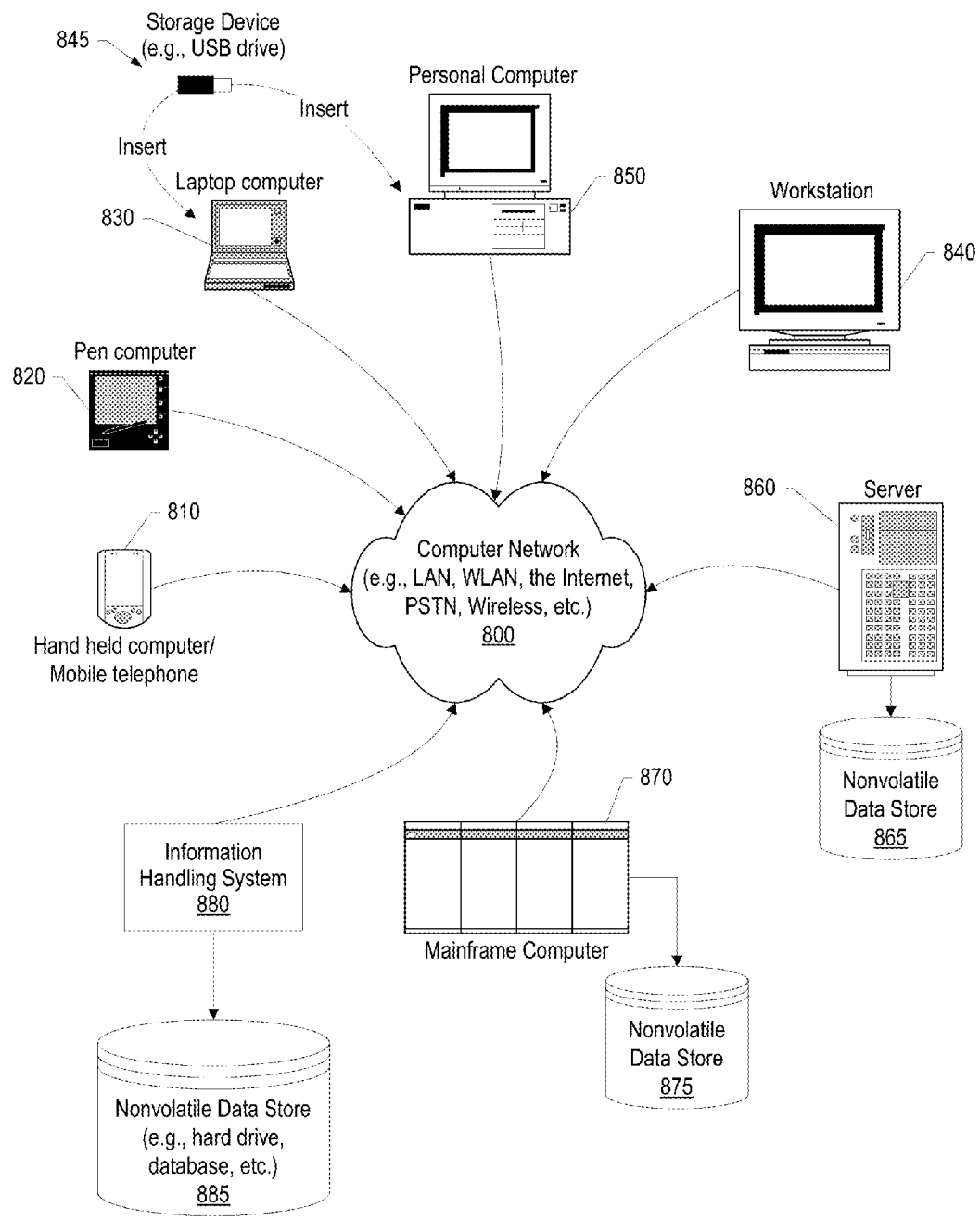
FIG. 8 provides an extension of the information handling system environment shown in FIG. 7 to illustrate that the methods described herein can be performed on a wide variety of information handling systems which operate in a networked environment.

FIG. 8 provides an extension of the information handling system environment shown in FIG. 7 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or notebook, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 745 can be shared among two or more information handling systems using various techniques, such as connecting the removable nonvolatile storage device 745 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
    receiving, from a centralized scheduler at a first host computer system, one or more path weighting updates to at least one of a plurality of path weightings, wherein the plurality of path weightings correspond to a plurality of available paths between the first host computer system and a second host computer system, and wherein each of the plurality of path weightings are based on at least one link included in its corresponding one of the plurality of available paths;
    identifying, at the first host computer system, a data flow corresponding to a data packet based upon selected header information included in the data packet, the data packet initiated by a first virtual machine residing on the first host computer system with a destination at a second virtual machine residing on the second host computer system;
    assigning, by the first host computer system, one of the plurality of available paths to the identified data flow based upon at least one of the one or more path weighting updates, wherein the assigned path corresponds to a pre-defined physical layer path from the first virtual machine to the second virtual machine over a computer network;
    modifying, by the first host computer system, the data packet by replacing a MAC destination address of the second host computer system in a header field of the data packet with a virtual MAC address corresponding to a path identifier of the assigned path; and
    sending the modified data packet over the computer network to the second virtual machine.

2. The method of claim 1 wherein the first host computer system includes a virtual switch, the method further comprising:
    creating, by a control plane included in the virtual switch, a flow table entry that includes a flow identifier and the path identifier, wherein the flow identifier corresponds to the selected header information and the path identifier corresponds to the assigned path; and
    wherein the modifying is performed by a data plane included in the virtual switch.

3. The method of claim 2 wherein the flow identifier includes the selected header information comprising a source IP address, a destination IP address, a source port number, a destination port number, and a protocol identifier.

4. The method of claim 2 wherein the data packet is included in a plurality of data packets that correspond to the identified data flow, the method further comprising:
    receiving a different data packet at the virtual switch, the different data packet included in the plurality of data packets;
    determining, by the data plane, that different header information included in the different data packet matches the flow identifier in the flow table entry;
    modifying the different data packet, by the data plane, by replacing a different MAC destination address in a different header field of the different data packet with the virtual MAC address corresponding to the path identifier; and
    sending the modified different data packet over the computer network to the second virtual machine.

5. The method of claim 1 wherein the centralized scheduler is a centralized flow scheduler, the method further comprising:
    monitoring, by the centralized flow scheduler, a plurality of link utilization rates between a plurality of network devices included in the computer network;
    detecting, by the centralized flow scheduler, at least one of the plurality of link utilization rates that exceeds a threshold;
    identifying, by the centralized flow scheduler, one or more network paths that include a selected link corresponding to the detected link utilization rate; and
    creating, by the centralized flow scheduler, at least one of the one or more path weighting updates for at least one of the one or more identified network paths.

6. The method of claim 5 wherein, for each of the one or more identified network paths, the method further comprises:
    determining, by the centralized flow scheduler, a number of links included in the identified network path;
    determining, by the centralized flow scheduler, the number of congested links included in the identified path; and
    computing, by the centralized flow scheduler, at least one of the one or more path weighting updates based upon the number of links and the number of congested links.

7. The method of claim 5 further comprising:
    identifying, by the centralized flow scheduler, one or more host computer systems, which includes the first host computer system, that utilize one or more of the identified network paths; and
    sending, by the centralized flow scheduler, the one or more path weighting updates to the one or more identified host computer systems, wherein at least one of the plurality of available paths matches at least one of the one or more identified network paths.

8. The method of claim 1 wherein the computer network is a software defined data center network.

9. An information handling system comprising:
one or more processors;
a memory coupled to at least one of the processors;
a virtual switch accessible to at least one of the processors; and
a set of computer program instructions stored in the memory and executed by at least one of the processors in order to perform actions of:
  receiving, from a centralized scheduler at a first host computer system, one or more path weighting updates to at least one of a plurality of path weightings, wherein the plurality of path weightings correspond to a plurality of available paths between the first host computer system and a second host computer system, and wherein each of the plurality of path weightings are based on at least one link included in its corresponding one of the plurality of available paths;
  identifying a data flow corresponding to a data packet based upon selected header information included in the data packet, the data packet initiated by a first virtual machine residing on the first host computer system with a destination at a second virtual machine residing on the second host computer system;
  assigning one of the plurality of available paths to the identified data flow based upon at least one of the one or more path weighting updates, wherein the assigned path corresponds to a pre-defined physical layer path from the first virtual machine to the second virtual machine over a computer network;
  modifying the data packet by replacing a MAC destination address of the second host computer system in a header field of the data packet with a virtual MAC address corresponding to a path identifier of the assigned path; and
  sending the modified data packet over the computer network to the second virtual machine.

10. The information handling system of claim 9 wherein the virtual switch performs additional actions comprising:
  creating, by a control plane included in the virtual switch, a flow table entry that includes a flow identifier and the path identifier, wherein the flow identifier corresponds to the selected header information and the path identifier corresponds to the assigned path; and
  wherein the modifying is performed by a data plane included in the virtual switch.

11. The information handling system of claim 10 wherein the flow identifier includes the selected header information comprising a source IP address, a destination IP address, a source port number, a destination port number, and a protocol identifier.

12. The information handling system of claim 10 wherein the data packet is included in a plurality of data packets that correspond to the identified data flow, the virtual switch performing additional actions comprising:
  receiving a different data packet, the different data packet included in the plurality of data packets;
  determining, by the data plane, that different header information included in the different data packet matches the flow identifier in the flow table entry;
  modifying the different data packet, by the data plane, by replacing a different MAC destination address in a different header field of the different data packet with the virtual MAC address corresponding to the path identifier; and
  sending the modified different data packet over the computer network to the second virtual machine.

13. The information handling system of claim 9 wherein the centralized scheduler is a centralized flow scheduler, the centralized flow scheduler performing additional actions comprising:
  monitoring a plurality of link utilization rates between a plurality of network devices included in the computer network;
  detecting at least one of the plurality of link utilization rates exceeds a threshold;
  identifying one or more network paths that include a link corresponding to the detected link utilization rate; and
  creating at least one of the one or more path weighting updates for at least one of the one or more identified network paths.

14. The information handling system of claim 13 wherein, for each of the one or more identified network paths, the centralized flow scheduler performing additional actions comprising:
  determining a number of links included in the identified network path;
  determining the number of congested links included in the identified path; and
  computing at least one of the one or more path weighting updates based upon the number of links and the number of congested links.

15. The information handling system of claim 13 wherein the centralized flow scheduler performs additional actions comprising:
  identifying one or more host computer systems, which includes the information handling system, that utilize one or more of the identified network paths; and
  sending the one or more path weighting updates to the one or more identified host computer systems, wherein at least one of the plurality of available paths matches at least one of the one or more identified network paths.

16. A computer program product stored in a non-transitory computer readable storage medium, comprising computer program code that, when executed by an information handling system, causes the information handling system to perform actions comprising:
  receiving, from a centralized scheduler at a first host computer system, one or more path weighting updates to at least one of a plurality of path weightings, wherein the plurality of path weightings correspond to a plurality of available paths between the first host computer system and a second host computer system, and wherein each of the plurality of path weightings are based on at least one link included in its corresponding one of the plurality of available paths;
  identifying a data flow corresponding to a data packet based upon selected header information included in the data packet, the data packet initiated by a first virtual machine residing on the first host computer system with a destination at a second virtual machine residing on the second host computer system;
  assigning one of the plurality of available paths to the identified data flow based upon at least one of the one or more path weighting updates, wherein the assigned path corresponds to a pre-defined physical layer path from the first virtual machine to the second virtual machine over a computer network;
  modifying, by the first host computer system, the data packet by replacing a MAC destination address of the second host computer system in a header field of the data packet with a virtual MAC address corresponding to a path identifier of the assigned path; and sending the modified data packet over the computer network to the second virtual machine.

17. The computer program product of claim 16 wherein the information handling system includes a virtual switch, and wherein the computer program code, when executed by the information handling system, causes the information handling system to perform additional actions comprising:
    creating, by a control plane included in the virtual switch, a flow table entry that includes a flow identifier and the path identifier, wherein the flow identifier corresponds to the selected header information and the path identifier corresponds to the assigned path; and
    wherein the modifying is performed by a data plane included in the virtual switch.

18. The computer program product of claim 17 wherein the flow identifier includes the selected header information comprising a source IP address, a destination IP address, a source port number, a destination port number, and a protocol identifier.

19. The computer program product of claim 17 wherein the data packet is included in a plurality of data packets that correspond to the identified data flow, and wherein the computer program code, when executed by the information handling system, causes the information handling system to perform additional actions comprising:
    receiving a different data packet at the virtual switch, the different data packet included in the plurality of data packets;
    determining, by the data plane, that different header information included in the different data packet matches the flow identifier in the flow table entry;
    modifying the different data packet, by the data plane, by replacing a different MAC destination address in a different header field of the different data packet with the virtual MAC address corresponding to the path identifier; and
    sending the modified different data packet over the computer network to the second virtual machine.

20. The computer program product of claim 16 wherein the computer network is a software defined data center network.

* * * * *